Nov. 6, 1962  R. A. COHEN  3,061,961
TRANSPARENCY VIEWER AND STORAGE DEVICE
Filed Sept. 20, 1956  2 Sheets-Sheet 1
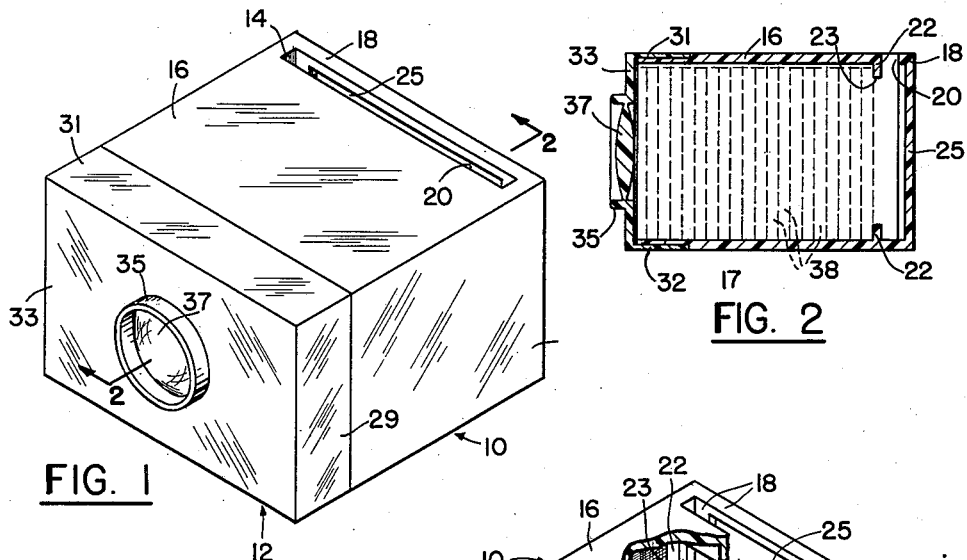
FIG. 1
FIG. 2
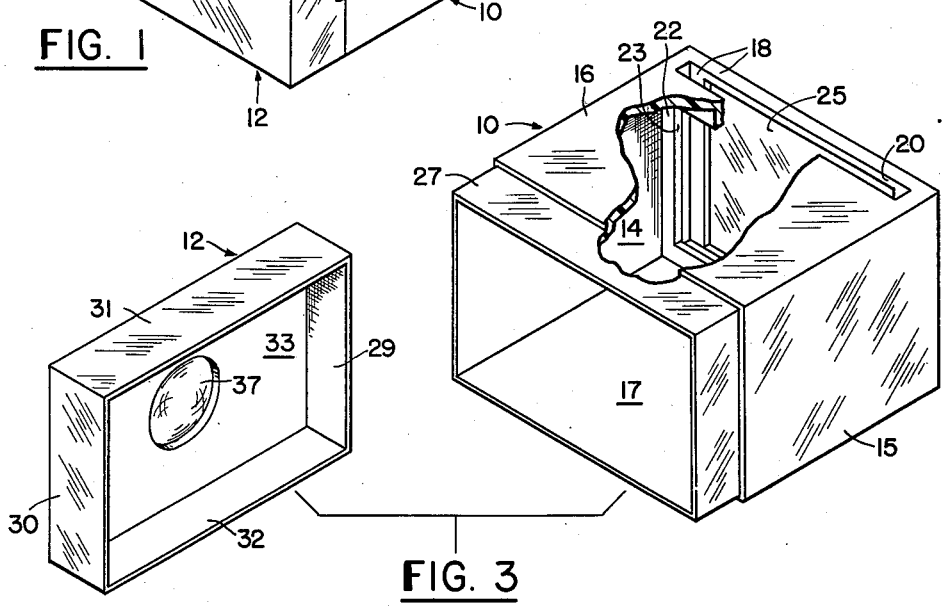
FIG. 3
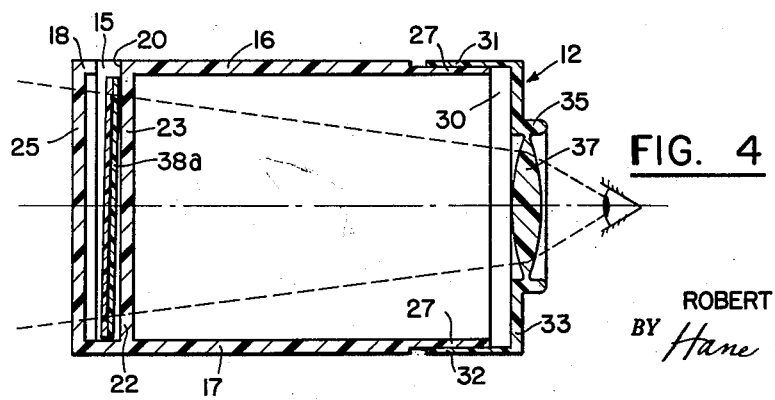
FIG. 4
INVENTOR.
ROBERT A. COHEN
BY Hane & Nydick
ATTORNEYS Nov. 6, 1962 R. A. COHEN 3,061,961
TRANSPARENCY VIEWER AND STORAGE DEVICE
Filed Sept. 20, 1956 2 Sheets-Sheet 2
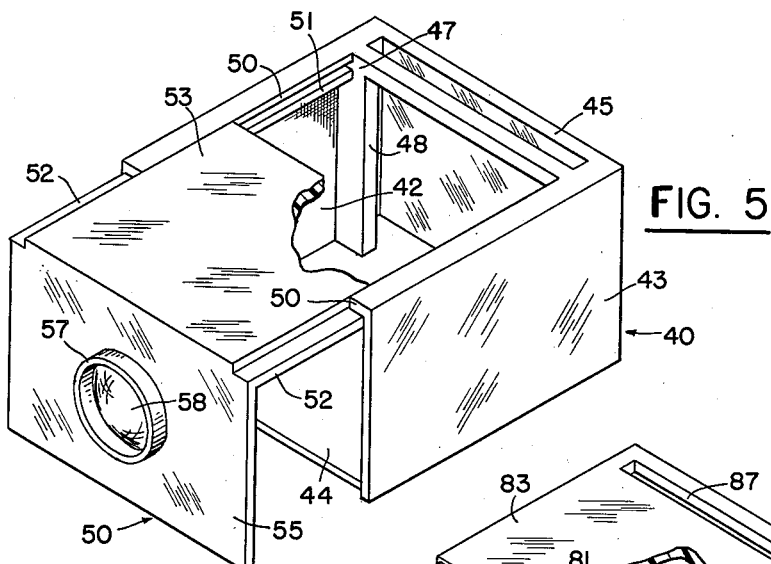
FIG. 5
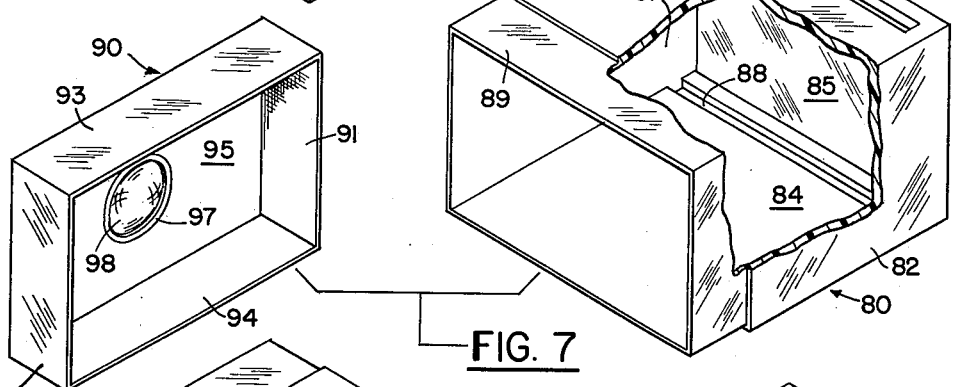
FIG. 7
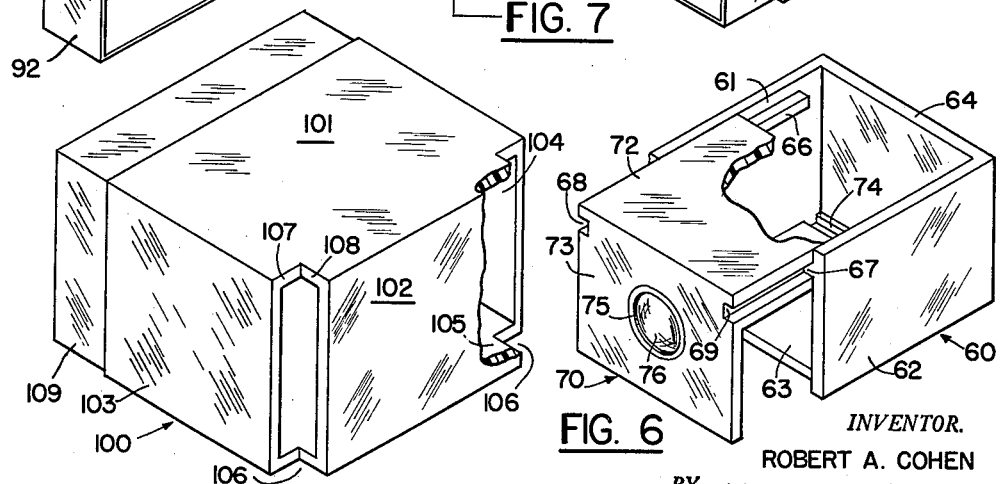
FIG. 6
FIG. 8
INVENTOR.
ROBERT A. COHEN
BY Hane + Nydick
ATTORNEYS

United States Patent Office 3,061,961
Patented Nov. 6, 1962

3,061,961
TRANSPARENCY VIEWER AND STORAGE DEVICE
Robert A. Cohen, 97—10 62nd Drive, Rego Park, N.Y.
Filed Sept. 20, 1956, Ser. No. 611,075
4 Claims. (Cl. 40—63)

This invention relates to transparency viewers and, more particularly, to viewers that are adapted for the storage of transparencies when not in use.

Ordinarily, photographic transparencies are stored in protective containers during the periods of time that they are not in use. Whenever it is desired to examine the transparencies, they are removed from such containers and placed in a suitable viewing device. It, therefore, becomes somewhat inconvenient whenever it is desired to view the transparencies in a single container, to also have to set up or obtain the viewing apparatus. This is particularly true when the transparencies are received from the photo-finishers and the customer desires to view only those transparencies received and to show these transparencies to relatives and friends.

An object of this invention, therefore, is to provide a combination storage box and viewer for transparencies that is simple in construction, efficient in operation, and which will overcome the aforementioned inconveniences.

Another object of this invention, is to provide a simple combination storage box and viewer for transparencies that may be manufactured in large quantities at reasonable cost which may be used by photo-finishers for returning developed transparencies to customers, in which the devices serve as protective storage containers and provide the customers with an immediate means of viewing the developed transparencies.

A still further object of this invention, is to provide a combination storage box and viewer for transparencies having a minimum number of parts, each of which may be molded of a plastic material.

Still another object of this invention, is to provide a two-piece combination storage container and viewer for transparencies having means for adjusting the focus of the viewer lens and providing adequate storage facilities for a substantial number of transparencies when the viewer is not in use.

All of the foregoing and still further objects and advantages of this invention will become apparent from a study of the following specification, taken in connection with the accompanying drawing, wherein:

FIGURE 1 is a perspective view of a combination storage container and viewer for photographic transparencies made in accordance with one form of the present invention;

FIGURE 2 is a reduced cross-sectional view taken along line 2—2 of FIGURE 1 showing the device being used as a storage container;

FIGURE 3 is an exploded perspective view of the device shown in FIGURE 1;

FIGURE 4 is a view similar to FIGURE 2, showing the apparatus as a transparency viewer;

FIGURE 5 is a perspective view with parts broken away showing a modified form of the present invention;

FIGURE 6 is a view similar to FIGURE 5 showing a still further modified form of the present invention; and FIGURE 7 is an exploded perspective view of a still further modified form of the present invention.

FIGURE 8 is a perspective view with parts broken away showing another modified form of the storage component of the present invention.

Referring now to FIGURES 1 to 4 of the drawing, a combination storage container and viewer for transparencies made in accordance with one form of the present invention is shown to include two major components, a box or container 10, and a closure member 12. As more clearly shown in FIGURE 3, the box 10 includes a pair of spaced parallel side walls 14, 15, a perpendicularly related top wall 16, a bottom wall 17, and a back wall 18. The rear portion of the top wall 16 is provided with a transversely extending slot 20 of sufficient width to permit the entrance of transparencies of any desired size.

A rectangular frame 22 with side walls, a top wall, and a bottom wall, is disposed immediately in front of and spaced from the back wall 18 so as to form a downward continuation of the slot 20 to guide and position a transparency therein. This frame has an enlarged centrally located aperture 23 that corresponds to a recessed central portion 25 of the back wall 18. The side, top, and bottom walls of the front of the box are of substantially reduced thickness to provide a continuous flange for slidably receiving the closure member 12.

The closure member has a pair of spaced side walls 29, 30, a top wall 31, a bottom wall 32, and a front wall 33. The front wall 33 has an outwardly extending circular flange or eye piece 35 which encompasses a lens 37. To facilitate the manufacture of the instant device, the box portion 10 is preferably molded of a translucent plastic material, while the closure portion 12 is preferably molded of a crystal clear transparent plastic material. As such, the central portion 25 of the back wall 18 of the box presents a diffused screen that will permit the passage of light therethrough that is transmitted through the transparency positioned within the slot 20, when the device is being used as a viewer. Similarly, the closure portion 12 being constructed of a transparent material, the lens 37 may be integrally molded therewith so as to provide a crystal clear view of the image transmitted therethrough. Of course, any desired color combination for the respective box and closure portions may be used, it being recognized that the color of the box will determine the color of the diffused light passing through the portion 25 of the back wall 18, and the color of the closure member 12 effecting the color of the image transmitted through the crystal clear lens 37 formed therewith.

The device may be used in the aforementioned manner, as a viewer, merely by inserting and removing one transparency at a time into the slot 20 adjacent to the back wall 18 of the device, the portion 25 being held toward a suitable source of light, and the eye being placed in proximity of the lens 37, as more clearly shown in FIGURE 4. The focus of the lens may be adjusted by sliding the closure 12 longitudinally along the flange 27 of the box. The closure 12 may also be removed, when desired, to place a substantial quantity of transversel extending and juxtaposed transparencies 38 within the box 10, after which, the closure 12 may be replaced and the transparencies safely stored therein for prolonged periods of time.

Referring now to FIGURE 5, a modified form of the present invention is shown, wherein the box or container 40 is provided with a pair of space side walls 42, 43, a bottom wall 44 and a back wall 45. Spaced a short distance forwardly from the back wall 45 and integral with the adjacent portions of the box 40, is a rectangular partition 47 having a centrally disposed enlarged aperture 48. This partition 47, together with the back wall 45, provides a downwardly extending slot that is suitable for receiving and positioning a transparency in a viewing position therein. The top of each side wall 42, 43, is provided with an inwardly extending upper web 49 and a spaced lower web 51 which define a slot therebetween for receiving the adjacent recessed edge 52 of the top wall 53 of the closure member 50. The lower web 51 on each side wall and the bottom wall 44 are slightly recessed rearwardly so as to accommodate the front wall 55 of the closure in flush association with the front edges of the side walls 42, 43. The front wall 55 includes an outwardly extending circular flange or eye piece 57, within which the lens 58 is disposed. In fabricating this device, the box 40 is preferably molded in one piece of a translucent plastic materials so that sufficient light may be diffused and transmitted through the back wall 45. The closure member 50, similarly, is preferably molded in one piece of a crystal clear transparent plastic material so that a clear image is visible through the integral lens 58. In use as a viewer, a transparency is positioned in the slot defined by the back wall 45 and the partition 47, and the eye placed in proximity with the lens 58. Adjustment of the focus may be had through longitudinal reciprocating movement of the closure member 50 along the guide slot defined between the webs 50, 51, of the box 40. When used as a storage container for transparencies, the closure 50 is moved to an extreme open position, and the transparencies arranged within the box 40 in a transversely extending direction, after which the closure 50 may be replaced.

A further modified form of the present invention is shown in FIGURE 6 of the drawing, wherein the container or box 60 is provided with a pair of spaced side walls 61, 62, a bottom wall 63, and a back wall 64. Each of the side walls 61, 62, is provided with an inwardly disposed and longitudinally extending guide rail 66, 67, that is slidably received within similarly shaped grooves 68, 69, in the side edges of the top wall 72 of the closure member 70. These guide rails 66 terminate short of the back wall 64 so as to provide a guideway for a transparency that is inserted therein through the open top of the box 60. This guideway is in vertical alignment with a transversely extending slot 74 in the bottom wall 63 of the box, for purposes hereinafter described. The closure member 70 also includes a front wall 73 which contains a centrally located flange or eye piece 75 within which the lens 76 is disposed. The forward edge of the bottom wall 63 is recessed slightly to the rear so as to accommodate the lower edge of the front wall 73 to permit a flush engagement of the front wall with the front edges of the side walls 61, 62.

In the manufacture of the device shown in FIGURE 6, the box section 60 is preferably constructed in one piece of molded translucent plastic material and the closure portion 70 constructed in one piece of a transparent, crystal clear, plastic material. In using this device, a transparency slide is inserted into the rear portion of the box, within the guideway formed by the back wall 64 and the rear edges of the rails 66, 67. The transparency is maintained within the box and prevented from falling through the slot 74 by grasping the box with a finger disposed beneath the slot 74. When desired, the transparency may be removed through the slot 74 and the next transparency placed in the guideway. When storing transparencies within this unit, the closure portion 70 is removed and the transparencies arranged within the box in a longitudinal direction which prevents them from being dropped through the open slot 74. The closure may then be replaced and the unit stored.

Referring now to FIGURE 7, a still further modified form of the present invention is shown to include a container or box portion 80 having a pair of spaced sides 81, 82, a top 83, a bottom 84, and a back wall 85. The rear portion of the top 83 is provided with a transversely extending slot 87 that is in registry with a similar transversely extending slot 88 in the bottom wall 84. The forward portion of each of the respective sides, top, and bottom, terminates in a flange 89 that is adapted to slidably support the closure member 90. The closure has a pair of spaced sides 91, 92, a top wall 93, a bottom wall 94, and a front wall 95. A circular eye piece 97 is supported on the outside surface of the front wall 95 and houses the integral lens 98. Similarly, the box portion 80 is preferably molded in one piece of a translucent plastic material, the closure portion 90 being molded in one piece of the transparent, crystal clear, plastic material. In use as a viewer, a transparency is inserted through the top slot 87 and into the bottom slot 88, the box being held so as to prevent the premature removal of the transparency therefrom. The focus of this unit may also be adjusted by sliding the closure 90 back and forth along the flanged portion 89 of the box. When using this unit as a storage container, the closure 90 is removed and the transparencies stacked within the box 90 in a longitudinal direction so as to prevent any of the transparencies from falling through the slots 87, 88.

Referring to FIGURE 8, another modification of the invention is shown in which the container or box portion 100 has a top 101, a back wall 102 which provides a diffused screen, a pair of spaced sidewalls 103 and 104, and a bottom 104. The rear portion of 100 is provided with corner openings 106 which have a pair of angularly disposed faces 107 and 108. The forward end of 100 is provided with a flange 109, akin for example to the flange 89 of FIGURE 7 whereby a closure member, such as 90, may be used in combination therewith.

This form of the device may be used as a viewer by inserting a transparency into one corner opening 106 so that it extends through to the second corner 106. With the lens-containing closure member in suitable focusing position and the transparency thus disposed forwardly of the diffused-screen back 102, it may be viewed.

It will be understood that this invention makes it possible to utilize the light-transmitting characteristics of the back wall of the container component to accomplish viewing of the transparency. If the back wall is transparent the slotting may be dispensed with and the transparency placed thereagainst with a diffuser positioned on the other side thereof.

Although the lens portion of the closure members has been shown as formed integrally with the closure member, it is to be understood that it may constitute a separate piece which may be inserted in the closure.

While this invention has been described with particular reference to the specific forms shown in the drawing, it is to be understood that such is not to be construed as imparting limitations upon the invention, which is best defined by the claims appended hereto.

I claim:

1. A transparency viewer comprising an integral housing having spaced side walls, a bottom wall, a top wall, and a back wall, said back wall comprising a translucent screen, guide means for controlling the placement and removal of transparencies adjacent to said back wall, a front wall including a lens having an axis perpendicular to said back wall, and said front wall and lens being adjustable relative to said guide means, the space between all of said respective walls defining a transparency storage area.

2. A transparency viewer comprising a one piece molded translucent container and a one piece molded transparent closure member, said container comprising integral spaced parallel side walls and a perpendicularly related back wall, said back wall including a centrally recessed integral translucent portion, said closure member being longitudinally and adjustably carried by said side walls and including a centrally disposed integral transparent lens, the axis of said lens being perpendicularly related to the plane of said back wall.

3. A transparency viewer comprising a one piece molded container and a one piece molded closure member, said container comprising integral spaced parallel side walls and a perpendicularly related light-transmitting back wall, said closure member being longitudinally and adjustably carried by said side walls and including a centrally disposed integral lens, the axis of said lens being perpendicularly related to the plane of said back wall.

4. A transparency viewer comprising a one piece molded container and a one piece molded closure member, said container comprising integral spaced parallel side walls and a perpendicularly related light-transmitting back wall, said closure member being longitudinally and adjustably carried by said side walls and including a centrally disposed lens, the axis of said lens being perpendicularly related to the plane of said back wall.

References Cited in the file of this patent

UNITED STATES PATENTS

| | | |
|---|---|---|
| 576,435 | Eddy | Feb. 2, 1897 |
| 1,912,233 | Whiting | May 30, 1933 |
| 2,182,514 | Ciechanow | Dec. 5, 1939 |
| 2,580,164 | Flynn | Dec. 25, 1951 |
| 2,608,903 | Nemeth | Sept. 2, 1952 |
| 2,805,500 | Dixler | Sept. 10, 1957 |